United States Patent [19]

Spruijt

[11] Patent Number: 5,768,346
[45] Date of Patent: Jun. 16, 1998

[54] METHOD FOR PROCESSING ENVIRONMENT-DEPENDENT ACCESS NUMBERS OF VOICE MAIL BOXES, AND A SYSTEM FOR VOICE MAIL HAVING ENVIRONMENT-DEPENDENT ACCESS NUMBERS

[75] Inventor: Cyrillus Patrick Spruijt, The Hague, Netherlands

[73] Assignee: Koninklijke PTT Nederland N.V., Netherlands

[21] Appl. No.: 492,957

[22] Filed: Jun. 21, 1995

[30] Foreign Application Priority Data

Jun. 24, 1994 [NL] Netherlands .................. 9401050

[51] Int. Cl.$^6$ ........................................ G06F 17/30
[52] U.S. Cl. .................. 379/67; 379/219; 379/352; 379/88; 379/100; 707/2; 707/100
[58] Field of Search .................. 379/67, 219, 88, 379/100; 370/352

[56] References Cited

U.S. PATENT DOCUMENTS

| | | | |
|---|---|---|---|
| 5,187,735 | 2/1993 | Herrero Garcia | 379/88 |
| 5,440,541 | 8/1995 | Iida | 370/352 |
| 5,450,488 | 9/1995 | Pugaczewski | 379/67 |
| 5,452,340 | 9/1995 | Engelbeck | 379/67 |
| 5,454,030 | 9/1995 | de Oliveira | 379/100 |
| 5,461,665 | 10/1995 | Shur | 379/67 |
| 5,555,290 | 9/1996 | McLeod | 379/88 |

FOREIGN PATENT DOCUMENTS

| | | |
|---|---|---|
| 0295904 | 12/1988 | European Pat. Off. . |
| 0507125 | 10/1992 | European Pat. Off. . |
| 0560111 | 9/1993 | European Pat. Off. . |
| 0567294 | 10/1993 | European Pat. Off. . |
| 0624967 | 11/1994 | European Pat. Off. . |

OTHER PUBLICATIONS

Newton's Telecom Dictionary by Harry Newton (pp. 770, 961, 1124, 1125, and 1126) Nov. 1994 Flatiron Publishing Chelsea, MI.

"Numbering Plan for the ISDN Era", ITU Recommendation E.164, Fascile II.2, pp. 135–140, no date.

*Primary Examiner*—Thomas G. Black
*Assistant Examiner*—Diane D. Mizrahi
*Attorney, Agent, or Firm*—Michaelson & Wallace; Peter L. Michaelson; John C. Pokotylo

[57] ABSTRACT

The invention relates to a method for processing an environment-dependent access number of a voice mail box, comprising interpreting the environment-dependent access number and converting it into an environment-independent access number, with the environment-dependent access number being capable of comprising an abbreviated access number related to a specific sub-environment, with interpreting taking place on the basis of properties of the access number, and with said properties comprising the presence of one or more prefixes. In accordance with the invention said properties, on the basis of which interpreting takes place, furthermore comprise the length of the environment-dependent access number. Preferably the environment-independent access number is composed of a first part and a second part, with one part corresponding with an abbreviated access number or an international access number and the other part comprising an additional code, which can be a code related to a sub-environment. The invention furthermore relates to a system for voice mail, in which said method is used.

18 Claims, 3 Drawing Sheets

METHOD FOR PROCESSING ENVIRONMENT-DEPENDENT ACCESS NUMBERS OF VOICE MAIL BOXES, AND A SYSTEM FOR VOICE MAIL HAVING ENVIRONMENT-DEPENDENT ACCESS NUMBERS

BACKGROUND OF THE INVENTION

The invention relates to a method of processing environment-dependent access numbers of voice mail, and to a system for voice mail having environment-dependent access numbers. More particularly, the invention relates to a method of processing an environment-dependent access number of a voice mail box. The environment-dependent access number may comprise an abbreviated access number related to a specific sub-environment. The method may comprise steps of interpreting the environment-dependent access number on the basis of properties of the access number, the properties comprising the presence of one or more prefixes and the length of the environment-dependent access number, and converting the environment-dependent access number into an environment-independent access number composed of a first part and a second part, with the first part comprising an environment-related code and the second part comprising an extension. A method of this kind is disclosed in European Patent Application EP-A-0 507 125, corresponding with U.S. Pat. No. 5,287,498.

Voice mail is a relatively recent development in telecommunications. In a telephone exchange or an information processing device (computer) connected thereto, voice mail boxes have been arranged with which a connection can be set up. In this context, the voice mail boxes may consist of memory space of the computer or exchange, which space is especially reserved for that purpose. In this context, a user can leave a spoken message (voice message) in such a voice mail box. The holder of the voice mail box can, at another time, listen to this message. Voice mail can therefore be used as an addition to the telephonic communication, for example, when the called party cannot be reached, but can also be useful for information and advertising purposes.

In the case of voice mail, the problem arises that the voice mail boxes must be individually and unambiguously addressable. In this context, voice mail boxes have to be provided with (access) numbers or identification numbers which are unambiguous and therefore to a certain extent unique, independent of the location where the numbers are entered. Furthermore, for a caller party (who leaves a message behind in the voice mail box, or reads it out) the voice mail box must be accessible in an easy manner, if the voice mail is to be commercially feasible.

It is possible to use access numbers for voice mail boxes, which numbers are basically equal to telephone numbers. In this context, the access numbers may be equal to existing telephone numbers and be associated with a specific telephone set so that when, for example, a specific telephone set is engaged, a connection may automatically be set up with a voice mail box. Access numbers can also be provided in addition to telephone numbers, so that, e.g., a subscriber has the disposal of two numbers: one for their telephone set (and/or facsimile set) and one for their voice mail box. By using numbers for voice mail boxes which correspond with telephone numbers, it is of great advantage that users do not have to learn new numbers or numbering structures, which consequently will promote the acceptance by the public and therefore the commercial success of voice mail.

In different environments (countries, companies) different kinds of numbers can be used. Thus, in accordance with the ITU proposal E.164, there are regional, national and international numbers. Furthermore, abbreviated internal numbers may exist within companies and institutions. Although a telephone subscriber can only be identified univocally on the basis of their international number, within a certain area (country, region, company) an abbreviated number will suffice, since the location of dialing the number, that is to say the environment, provides additional information. Worded differently, depending on the environment (such as a country, region, or a company network) where the number is entered into a dialing set (such as a telephone), the number can have a structure adapted to the environment, such as an abbreviated or national number, as a result of which the number is environment-dependent.

By using numbers for voice mail corresponding with telephone numbers, the problem arises that the voice mail has to interpret the different kinds of numbers and, if need be, convert these. Also, conflicts may not arise between the different kinds of numbers; therefore, the access numbers of the voice mail boxes have to be unique. Such conflicts can be avoided by using numbers having a fixed, and therefore large, length. If, however, voice mail numbers having a fixed length are used, in a simple manner, a unique identification of voice mail boxes can indeed be provided. However, in most cases such fixed length voice mail box numbers will not conform with telephone numbers, and the user will have to enter a unnecessarily large number of dialing digits.

European Patent Application EP-A-O 507 125 discloses a numbering plan for a voice messaging system having a plurality of sites. In this distributed system, each site may comprise several extension ranges. A number length criterion is used to distinguish network address extension ranges, i.e., to distinguish different addresses within the sites. Ambiguity may arise as extensions having identical lengths may belong to the same site. This European Patent Application does not deal with a centralized voice mail system, nor with differences between regional, national and international numbers. In particular, the European Patent Application does not deal with the problem of how such differences can effectively be handled by a voice mail system.

European Patent Application EP-A-0 624 967, published after the priority date of the present application, describes the addressing in a network of voice mail systems. It is suggested to convert a locally defined address into a site address plus a user subadress. This European Patent Application does not disclose a solution to the problem that users may want to enter different kinds of numbers having different lengths, e.g., national and international numbers, referring to the same voice mail box.

SUMMARY OF THE INVENTION

An object of the invention is to eliminate abovementioned and other disadvantages of the prior art and non-prior art methods and to provide a method for processing an environment-dependent access number of a voice mail box, which makes it possible to interpret access numbers of voice mail boxes and to convert these if necessary, such that the voice mail boxes can be addressed in a simple and unambiguous manner.

A further object of the invention is to provide a method of this kind which permits access numbers of voice mail boxes to be entered in different manners.

Another object of the invention is also to provide an efficient universal, that is to say, environment-independent representation of access numbers of voice mail boxes.

A still further object of the invention is to provide an efficient and effective method for interpreting and converting environment-dependent access numbers.

The method of the invention, to that end, is characterized in that the length of the environment-dependent access number is used to distinguish between different types of numbers, the types comprising abbreviated numbers (if applicable), regional numbers, national numbers, and preferably also international numbers.

This has the advantage that, e.g., abbreviated access numbers of private numbering plans, such as used, for example, in larger companies, can be recognized by their length. Therefore, no additional information, such as an additional dialing digit (prefix), has to be added to the abbreviated access numbers, which facilitates the use of voice mail. Furthermore, the method in accordance with the invention is advantageous in that it provides the possibility to interpret and convert both access numbers originating from sub-networks and access numbers originating from individual users. The method of the invention thus allows the users to enter various types of numbers having different lengths, such as national and international numbers. A user accustomed to his local network may use an abbreviated number when entering digits manually, or may enter a national or even international number when utilizing their autodialler. In accordance with the method of the invention, all these numbers will be converted into a unique, environment-independent number used to address a voice mail box.

The environment-independent access number is composed of a first part and a second part, with the first part comprising an environment-related code and the second part comprising an extension. In this context, the environment-related code is a code which is associated with the environment in which an access number is entered, that is to say, with the user who enters the access number. Also, the environment-related code advantageously has a length which depends on the number of users which are located in the environment concerned. With the help of the extension, a further specification can be provided within the environment. By the composition of environment-independent access numbers, a uniform structure can be offered for unique access numbers. With such a uniform structure, a simple and efficient addressing of the voice mail boxes is provided, and also a simple check on the unicity of the environment-independent access numbers becomes possible, whereas a uniform structure also simplifies converting an access number into the structure.

Advantageously the environment-related code comprises a code assigned to a sub-environment and the extension comprises an abbreviated access number. Such a code can possibly be related to one or more users of the sub-environment, but preferably is the company code of a company network or another appropriate identification code of a sub-environment (sub-network). In this manner, the existing codes can be used in order to form unique environment-independent access numbers having a relatively short length. Possibly, one or more digits can be added to the company code of a sub-network in order to form the environment-related code.

The abbreviated access number will generally be the shortest environment-dependent access number, i.e., the access number having the fewest (dialing) digits, which corresponds with a specific voice mail box. With the environment-related code, the access number can be complemented such that a unique environment-independent access number arises. With such a composition of the environment-independent access number, a unique identification with a minimum number of digits is possible, since both the environment-related code and the abbreviated number can be assigned to a voice mail box in an efficient manner, without having to take the existing region codes or country codes into account.

Preferably the environment-independent access number comprises a fixed number of digits. Thus, in a preferred embodiment of the method in accordance with the invention, the environment-independent access number may consist of ten digits, with the abbreviated number and the additional code, for example, each comprising five digits. Other number lengths are, in principle, however, also possible.

In some cases, it may be advantageous to perform the method in accordance with the invention such that the second part of the environment-independent access number possesses a length equal to zero. Worded differently, the extension is empty and the access number is substantially formed by the first part, which comprises the environment-related code. This is advantageous if an environment only comprises one user, such as in case of an individual subscriber.

It is possible to execute the method in accordance with the invention such that the first part of the environment-independent access number comprises an international access number. Worded differently, the environment-related code is formed by, or at least comprises, an international access number. If, in this connection, the second part is empty, the environment-independent access number can even be equal to an international access number. This can, for example, be the case if no corresponding abbreviated number is available of a specific environment-related access number, for example, if the number concerned does not belong to a sub-network. The method in accordance with the invention can convert such numbers into international numbers. However, such converting may be omitted if the entered (environment-dependent) access number is already equal to an international number. Advantageously, the method in accordance with the invention therefore converts depending on the number concerned. Possibly, the second part can, in addition to the international number, comprise an additional code.

In the method in accordance with the invention, the environment-independent access number may be unique for a specific region, a specific country or group of countries, but preferably is a globally unique access number, so that an unambiguous addressing of the voice mail boxes is possible. This has the advantage that a voice mail box, independent of its location, can be addressed and identified in an unambiguous manner.

Preferably, an access number for voice mail has the same structure as a telephone number. Worded differently, for voice mail and for telephony, the same numbering structure is applied, such as the numbering structure in accordance with E.164 [1]. In this context, voice mail numbers can coincide with telephone numbers, so that a voice mail box and a telephone set can be reached via the same number, or separate numbers can be provided for voice mail boxes and telephone numbers. In the latter case, the voice mail boxes can possibly be recognized by a specific numbering assignment, such as the occurrence of a specific characteristic digit in the number. The use of telephone numbers for identifying voice mail boxes furthermore is advantageous as the user does not have to learn new numbers, which promotes the accessibility of the system.

An access number, in most cases, shall then comprise a number of dialing digits. In this context, the term "digit" must also mean another sign such as "*" or "#". To recognize national and international numbers, prefixes are advantageously used, with for example a first prefix being equal to "0" and a second prefix being equal to "00".

For determining the first and second part of an access number, the data related to the number have to be determined. Although the access number can be compared in a list with all other possible access numbers, preferably it is verified whether an access number falls within limits corresponding with an environment. In order to make a fast and efficient processing possible, the method in accordance with the invention is preferably executed such that an access number is compared with upper limits and lower limits of access numbers possible within respective environments, and that, on the basis of the comparisons, an environment-related code is added to the access number and/or the second part of the access number is determined.

A system for voice mail having environment-dependent access numbers, comprising a voice mail device(s) (or other devices) for storing and reproducing voice in voice mail boxes which are accessible by access numbers, a network (or other devices) for transferring voice and access numbers, and a processing member for interpreting environment-dependent access numbers and for converting these into environment-independent access numbers, with the environment-dependent access numbers being capable of comprising abbreviated access numbers related to a specific sub-environment, the processing member being arranged for interpreting on the basis of the presence of one or more prefixes, in accordance with the invention is characterized in that the processing member interpreting environment-dependent access numbers is arranged for determining the length of an access number and interpreting, also on the basis of the length, the environment-dependent access number. Preferably such a system is arranged such that a voice mail box possesses different related environment-dependent access numbers in different environments.

REFERENCES

[1] ITU proposal E.164
[2] EP-A-0 560 111
[3] EP-A-0 507 125 & US 5 287 498
[4] EP-A-0 624 967

These publications are herewith incorporated by reference in this text.

BRIEF DESCRIPTION OF THE DRAWINGS

The invention will now be described more in detail on the basis of the Figures.

DETAILED DESCRIPTION

Figure 1:
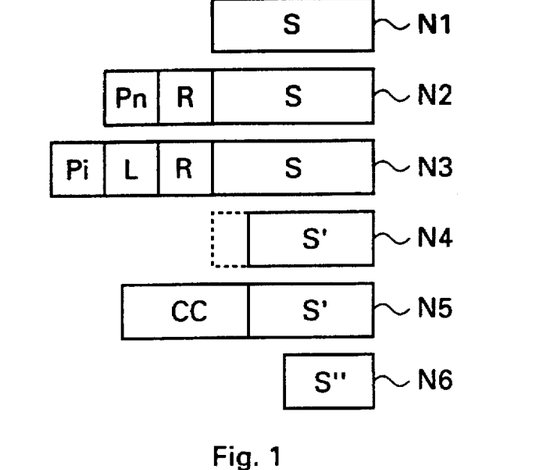
FIG. 1 diagrammatically shows the possible composition of an access number of a voice mail box.

The access numbers N1, N2, N3, N4, N5 and N6, diagrammatically shown in FIG. 1, are composed of different parts. The number N1 only consists of a subscriber part S and therefore is a regional number. The number N2 not only comprises a subscriber part S but also a region code R and a regional prefix Pn and therefore is a national number. The number N3 is composed of a subscriber part S, a region code R, a country code L, and an international prefix Pi and thus forms an international number. The structure of the access numbers N1, N2 and N3, in this context, corresponds with the structure of telephone numbers, such as laid down in standard E.164 (reference [1]). Depending on the environment (context) in which the number is dialled, that is to say, is entered in an appropriate telecommunication device, the length of the number will vary. Thus, within the region in which the voice mail box is located, only the section S need to be dialled. In accordance with one aspect of the invention, within the region it is also possible to use the other composition, such as a national number (N2).

The number N4, also represented in FIG. 1, is an abbreviated number with only an abbreviated subscriber part S', which is shorter than the subscriber part of the numbers N1-N3. The abbreviated number N4 can be dialled in a sub-network, such as a company network. If the numbers N1-N4 address the same voice mail box, in the Dutch situation, the numbers can for example have the following composition:

| N1 | 3325376 |
|----|---------|
| N2 | 0-70-3325376 |
| N3 | 00-31-70-3325376 |
| N4 | 25376. |

It will be understood that it is preferable to, if this is possible, use as short a number as possible, such as N4. In this context, however, a simple and efficient interpretation of the (possible abbreviated) number and an unambiguous conversion into a unique number has to be provided. To this end, the invention provides an appropriate method. In accordance with a first aspect of the invention, the number length, especially the length of the subscriber part S, is used for interpreting the number concerned. In accordance with a further aspect of the invention an environment-dependent access number is converted into an environment-independent access number, which possesses the structure of the number N5. The number N5 is composed of an abbreviated number S' and a sub-network code (company code) CC. In this context, the code CC is related to the sub-network, in which the abbreviated number S can be entered.

Pursuing the above-mentioned example, if the code CC of the sub-network is for example 11456, the number N5 can have the following composition:

| N5 | 1 1456-25376. |
|----|---------------|

Finally, the number N6 is a special access number for reserved voice mail boxes or for special services in a system for voice mail. The number has a length which, in general, will be smaller than S' and in many applications will comprise approximately three digits.

Figure 2:
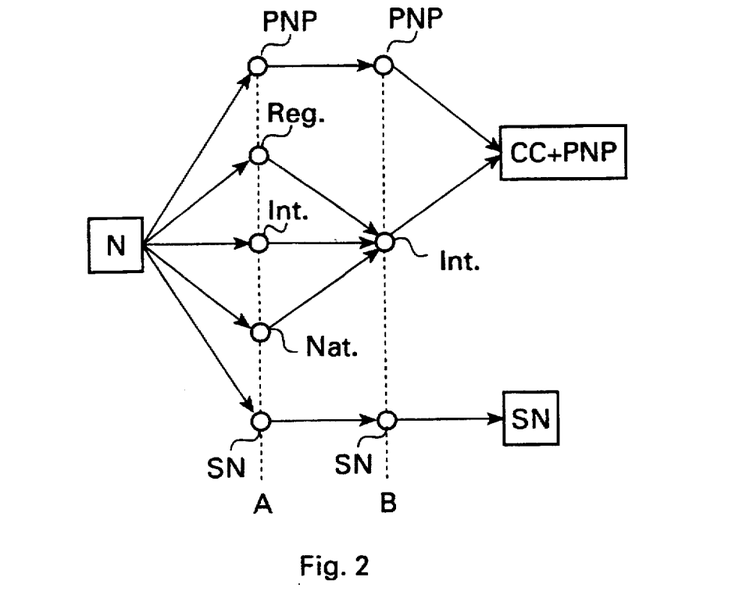
FIG. 2 shows a diagrammatic survey of interpreting and converting access numbers in accordance with the invention.

The diagram, shown in FIG. 2, indicates how an access number for voice mail in accordance with the invention can be interpreted and converted. A number N, in principle, can be an abbreviated number (PNP), a regional number (Reg.), an international number (Int.), a national number (Nat.) or a special number (SN), corresponding with N4, N1, N3, N2, and N6, respectively, in FIG. 1. In a first phase of the method, indicated diagrammatically by "A" in FIG. 2, the number N has been interpreted and classified into one of the five mentioned classes. Then the number, if it is a national or regional number, is converted into an international number (preferably without an international prefix). Abbreviated, special or international numbers are not changed in this phase. In a second phase, indicated by "B", the number has therefore been classified in one of the classes abbreviated number (PNP), international number (Int.), or special number (SN). Finally, the number, unless it is a special number (SN), is converted into an environment-related code, such as a sub-area code (CC), and an extension, such as an abbreviated number (PNP). In accordance with one aspect of the invention, the composition of the number, that is to say first part and second part (CC+PNP), is used as a universal or an environment-independent access number. In this context, it is possible that the first part of the number, indicated by CC, is not really a sub-network code, but an (international) access number, in which case the conversion from international number (Int.) in phase B into "sub-network code" (CC) can be trivial in the final phase. Furthermore, the extension (PNP) can be empty, especially if, in the above-mentioned case, the first part of the number comprises an international number.

Figure 3:
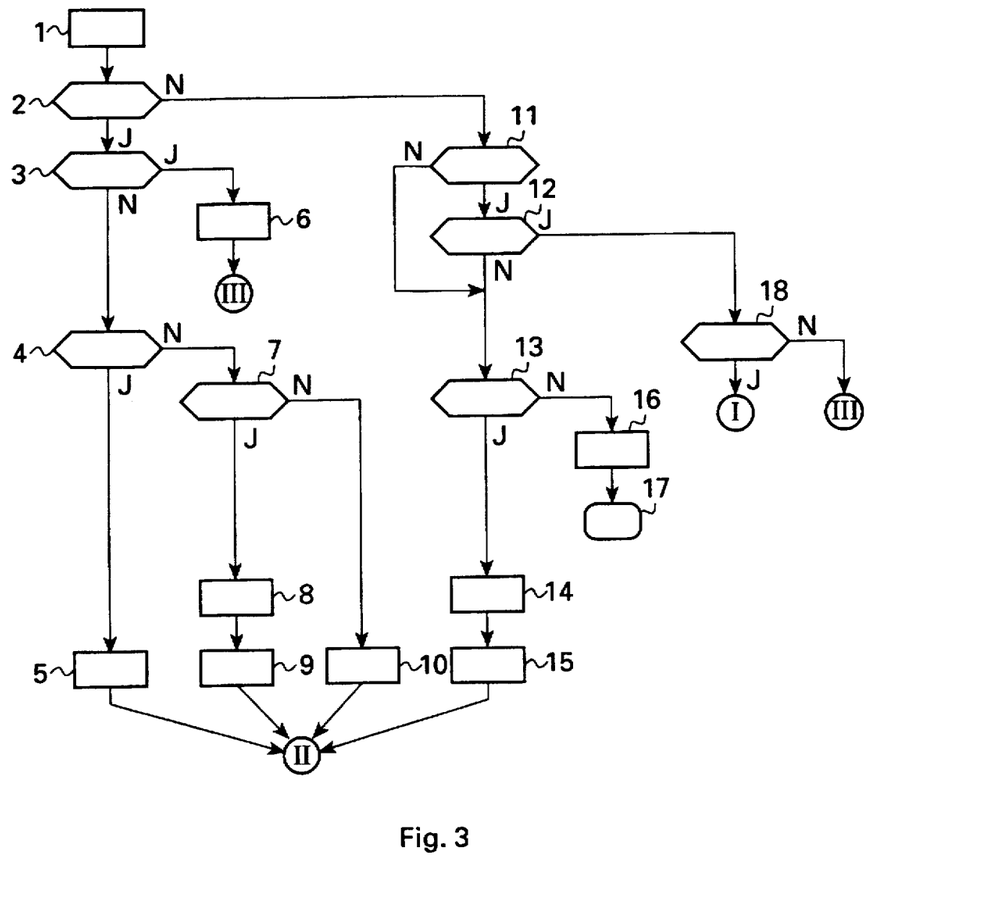
FIG. 3 diagrammatically shows a first part of interpreting and converting access numbers in accordance with the invention.

The flow diagram, shown in FIG. 3, illustrates, in more detail, an embodiment of the method for interpreting and converting access numbers for voice mail in accordance with the invention. The various steps of the method have been represented by blocks, with blocks having rectangular sides representing processing steps and blocks having hypotenuse sides represent testing steps. It will be clearly understood that, dependent on the results of the testing steps, different branches of the flow diagram will be followed and that, therefore, for a specific access number not all steps of the method represented here will be executed. In FIG. 3, the phases A and B of FIG. 2 have been integrated for the sake of efficiency. The states I, II and III of FIG. 3, however, correspond with the completion of phase "B" in FIG. 2.

In FIG. 3, it has been assumed that the access numbers of the voice mail boxes, at least regarding their structure, correspond with telephone numbers. It will be understood that the term "telephone number" in this connection can also mean facsimile number, car telephone number and such. In the example shown, as was mentioned with reference to FIG. 2, five kinds of numbers can occur: PNP numbers (Private Numbering Plan), special mail box numbers, regional numbers, national numbers and international numbers, with the three last-mentioned kinds of numbers preferably being composed in accordance with the proposed E.164.

An (environment-dependent) access number in the example of FIG. 3 can thus consist of an abbreviated number of a Private Numbering Plan, where such abbreviated numbers may have a variable length. On the basis of FIG. 3, it will be explained how a voice mail application, can process the various kinds of numbers by using the method in accordance with the invention.

In a first step, indicated by 1, the series of digits is received which forms the environment-dependent access number to be interpreted. In the second step 2, (test: first digit =0?) it is verified whether the first digit is a zero (0) and therefore whether this can be a national or an international number. If this is the case, step 3 follows, otherwise step 11, which will be discussed later on. In step 3 (test: number: length <4?) it is verified whether the length of the series of digits is smaller than or equal to four, an application-dependent length criterium. If this is the case, it is concluded that the number is a special mail box number and, after having removed the first zero in step 6 (action: remove prefix 0), the flow diagram is left at III, after which further processing of the number can follow, as will be explained later on in more detail on the basis of FIG. 4. If the test of step 3 has a negative result, step 4 follows.

In step 4 (test: second digit =0?) it is verified whether the second digit is a zero. If this is the case, the number apparently is an international access number. The zeros are removed in step 5 (action: remove prefix 00) and the flow diagram is left at II. If the test in step 7 has a negative result (test: user information available ?), it is verified whether additional information is available related to the user concerned, i.e. the user who entered the number and his/her environment. If this is the case, in step 8 (action: retrieve user information) the user information (environment-related information) is retrieved and then, in step 9 (action: remove prefix 0, add country code), the number is converted into an international number, after which the diagram is left at II. If the test of step 7 has a negative result, in step 10 (action: remove prefix 0, add country code concerned), the number is converted into an international number having the country code of the country in which the number was dialled (default), for example "31" for the Netherlands. Then, the diagram is left at II.

If it has been determined, in step 2, that the first digit of the number is not a "0", and therefore not a prefix, it is verified in step 11 (test: subenvironment information available ?) whether information related to the subenvironment concerned (for example a company network) is available. In case of a negative test result, step 13 follows, in case of a positive result, step 12 (test: number length < maximum PNP length ?), where it is tested whether the length of the number is smaller than or equal to the maximum length which abbreviated numbers (PNP numbers) can have in the specific application. The maximum length can for example be five. If the test of step 12 has a negative result and the number therefore has a larger length than an abbreviated number (PNP number), step 13 follows, otherwise step 18.

In step 13 (test: user information available ?), as in step 7, it is verified whether additional information is available related to the user concerned, i.e. the user who has entered the number and his/her environment. If this is the case, in step 14 (action: retrieve user information), the user information is retrieved and then, in step 15 (action: add country code and region code), the number is converted into an international number on the basis of the user information and with the aid of corresponding country code and region code, after which the diagram is left at III. If the test of step 13 has a negative result, it is concluded that the number is not a valid number and this is reported, in step 16 (action: report invalid number), for example by delivering an error message, after which the procedure is terminated at 17.

In step 18 (test: number length < minimum PNP length ?), it is verified whether the length of the number is larger than or equal to the minimum length which abbreviated numbers (PNP numbers) can have in the specific application. The minimum length can be smaller than the earlier-mentioned maximum length and can for example be three, but can also be equal to said maximum length. If the number possesses said minimum length (and the length in accordance with step 12 is not larger than the maximum length for PNP numbers) it is concluded that the number is a PNP number and the diagram is left at I. If the number is not a PNP number as it has a smaller length, it is concluded that it is a special number and the diagram is left at III. It has to be noted that a special number can be detected on two locations in the diagram of FIG. 3, viz. at step 3 and at the steps 12 and 18.

It is noted that the above-used values, such as "00" as an international prefix and "0" as a national prefix, are only used by way of example and that in some countries different values can occur.

As is explained in the above on the basis of FIG. 3, the invention provides an efficient method for interpreting and converting access numbers for voice mail with a variable length. In this context, it is basically possible to enter a specific access number in different manners, for example as an abbreviated number, or as a national number. Abbreviated numbers and special numbers are recognized on the basis of a length criterium (see for example the steps 3, 12 and 18). Although as a result of this, limits can be put to the number lengths of abbreviated and special numbers, in practice this does not lead to problems. The advantage of applying a length criterium is particularly based on the fact that no additional prefixes or first digits for special or abbreviated numbers need to be reserved, as a result of which the length of a number to be entered can remain limited and an optimum dialing freedom is guaranteed when assigning numbers to mail boxes. With the method in accordance with the invention, a user therefore has a large degree of freedom when entering access numbers, since within an environment several manners of entering are possible. Thus, with reference to the example given on the basis of FIG. 1, a user within the sub-network concerned can dial the unique access number 1145625376 (N5 in FIG. 1) by entering either 25376 (N4), or 3325376 (N1), or 0703325376 (N2), or 0031703325376 (N3). It is to be observed that the user does not have to know the sub-network code (CC) and that he does not have to use a prefix, within the sub-network, in order to dial a regional number. A voice mail system working in accordance with the method of the invention can recognize all the options mentioned and of processing these in an appropriate manner.

As mentioned, in the example of FIG. 3 the steps of interpreting and converting have not been represented as strictly separated, but as being integrated, which promotes the efficiency of the method. However, it is also possible to execute the method in accordance with the invention in such manner that, in accordance with FIG. 2, first an interpretation and then a conversion of the number is executed.

The additional information for complementing abbreviated numbers, as applied in the method in accordance with the invention, is preferably accommodated in one or more databases, which are stored in a memory of an information processing device (computer, part of a telephone exchange). The data required to this end, situated in appropriate databases, comprise for example lists with sub-networks (such as company networks) and corresponding sub-network codes (company codes), which in accordance with the invention are added to the PNP numbers in order to form an environment-independent number (see also FIG. 2 and FIG. 4). Furthermore, the mentioned data can comprise lists having national numbers (of a specific country) and the corresponding country codes and region codes. It is also possible, that the maximum and minimum PNP lengths of the different sub-environments (sub-networks) are stored in a database, and that the various tests such as the tests in the steps 12 and 18 are carried out on the basis of the sub-network-related length criteria.

Figure 4:
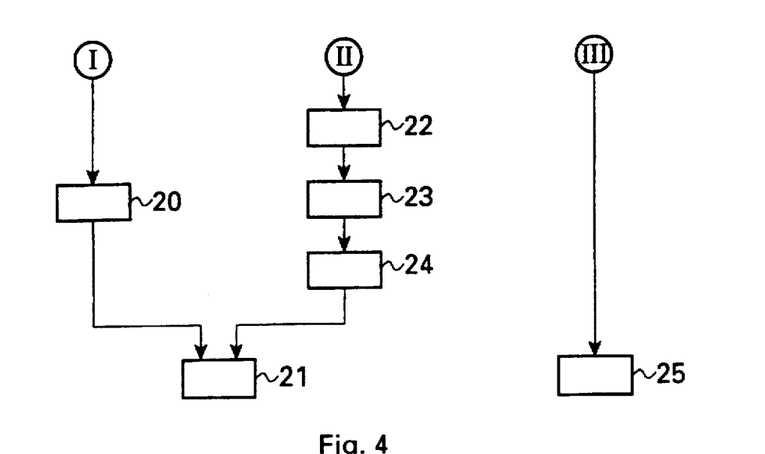
FIG. 4 diagrammatically shows a second part of interpreting and converting access numbers in accordance with the invention.

The flow diagram of FIG. 4 diagrammatically shows a possible continuation of the method represented in FIG. 3, with the indications "I", "II" and "III" in FIG. 4 corresponding with those in FIG. 3. If the diagram of FIG. 3 has been left at I (abbreviated number), hence the method is proceeded at I in FIG. 4. In step 20 (action: determine sub-network code), the sub-network code (company code) of the abbreviated number is determined. This can occur on the basis of databases in which the sub-network codes have been incorporated. Advantageously, a sub-network code is searched (see also step 11) by means of a comparison of the abbreviated number with a lower limit and an upper limit of the numbers of a sub-network. If, for example, the numbers 21000 (lower limit) to 23000 (upper limit) have been assigned to a sub-network of a company, it will suffice to compare an abbreviated number (for example 22345) with the limits mentioned in order to be able to determine that the number does indeed belong to the sub-network concerned. Comparing the number with the limits can of course be executed with the help of a common data processing device (computer).

After the sub-network code has been determined, in step 21 (action: combine abbreviated number and sub-network code), it is added to the abbreviated number, as a result of which a universal environmentindependent number arises. With said last-mentioned number the voice mail box can be addressed in a unique manner.

If the diagram of FIG. 3 has been left at II (international number), in step 22 (action: search for list element with series comprising the international number), a list element is searched on the basis of a list, incorporated in a database. Searching preferably takes place with the help of a binary search algorithm (known per se) on the basis of lower limits and upper limits of the respective list elements. As already mentioned in the above with reference to step 11, by using lower and upper limits a simple and quick search procedure is made possible. In step 23 (action: determine extension length and subnetwork code), the sub-network code (environment-related code) is determined (that is to say read-out from the list element) which corresponds with that list element. On the basis thereof, in step 24 (action: convert international number into abbreviated number), the last X digits of the international number are taken, with X being the extension length found in step 22. Finally, said X digits are added, in step 21 (action: combine abbreviated number and sub-network code) to the sub-network code, so that a unique access number results. It is possible that the extension length is equal to zero, and that the "abbreviated number" is therefore empty. In such cases, the environment-related code will be a number not belonging to a specific sub-network. The "sub-network code" which is read-out from the list, is then formed by a number (which is international or not) which is either equal to the previously determined international number, or differs from it and replaces the number.

The steps 22 to 24 inclusive will be explained on the basis of a simple example. Suppose, that an international number is 31703325376 and the list element in the database comprises the values 31703321000 (lower limit), 31703328000 (upper limit), and 5 (extension length X). Furthermore, the list element may e.g. comprise the values 31 (country code) and 11456 (subnetwork code). A comparison results in the number 31703325376 being larger than 31703321000 and smaller than 31703328000, so that the list element concerned is correct (step 22). The extension length of said list element appears to be 5, and the sub-network code is 11456 (step 23). The extension length 5 indicates that the last five digits, viz. 25376, produce the abbreviated number searched (step 24) which is subsequently combined with the sub-network code 11456 in order to produce the unique access number 1145625376 (step 21).

If the diagram of FIG. 3 has been left at III (special number), a conversion into a number having the structure CC+PNP (see FIG. 2) is not necessary. On the basis of the special number interpreted as such a unique number can be determined, for example, by reading it out of a table. The special number can also be used for addressing a voice mail box or for activating a special voice mail service.

It will be understood that numbers, which in principle do not consist of an abbreviated number and additional digits, can also be converted in this manner. With such numbers, which are consequently not associated with a sub-network (sub-environment), the extension length can advantageously be zero and the mentioned upper and lower limits can coincide. Suppose, that the access number to be processed is 31206211811, and that this is a number of a private subscriber (not a sub-network), the corresponding list element, for example, can then comprise the values 31206211811 (upper limit), 31206211811 (lower limit), 0 (extension length X) and the field of the subnetwork code comprises, for example, the number itself. Therefore, in the steps 24 and 21 the number can remain unchanged and as such already forms the unique access number desired. In step 21, the number 31206211811 is preferably completely substituted by a "sub-network code" (environment-related code) determined in step 23, which either also is 31206211811, or differs therefrom and for example is 251736202. The environment-related code in that case is related to a (sub-) environment which is formed by one subscriber. With the access number, obtained in accordance with the diagram of FIG. 4, the voice mail box concerned can be addressed directly and unambiguously.

It is noted that dependent on the voice mail system concerned, an obtained unique access number for addressing can be converted into a number valid for the system concerned. Such a conversion can, for example, take place on the basis of a table and need not affect the method in accordance with the invention.

Although the method in accordance with the invention has been explained on the basis of interpreting access numbers of voice mail, said method can also be used on telephone numbers, facsimile numbers or other identification numbers.

Figure 5:
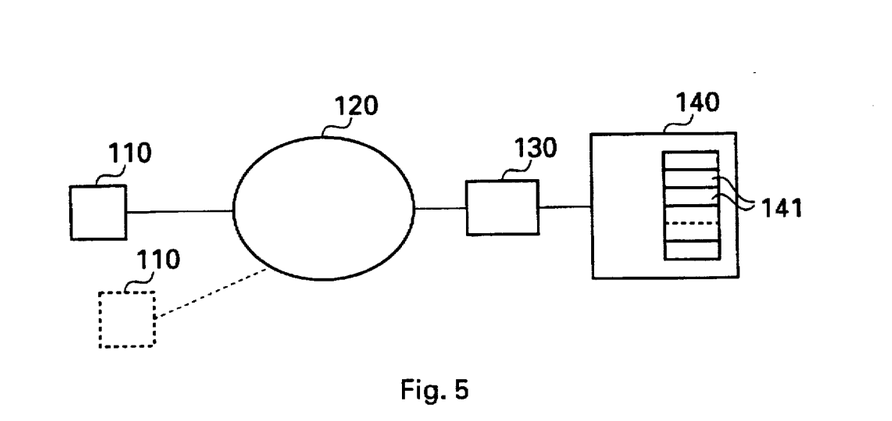
FIG. 5 diagrammatically shows a system for voice mail in accordance with the invention.

The system 100, represented diagrammatically in FIG. 5, for voice mail in accordance with the invention comprises a telecommunication set 110, which may for example be a telephone set, a telecommunication network 120, a processing member 130 and a voice mail device 140. Several sets 110 can be connected to the network 120. The processing member 130 is arranged for executing the method in accordance with the invention and to that end can be provided with appropriate commercially available components, known per se, such as input and output members, a microprocessor for executing the method, a memory for storing data related to an access number and a further memory, for example in the form of a disc unit for storing databases having list elements which for example comprise (number) limits of environments, sub-network codes and/or extension lengths. Advantageously at least some components of the processing member 130 have been combined in an application-specific integrated circuit (ASIC).

The voice mail device 140 coupled to the processing member 130 is provided with voice mail boxes, which have been diagrammatically indicated by 141. In practice, the voice mail boxes can be formed arbitrary and, in principle, varying parts of a memory belonging to the voice mail device 140.

Advantageously, the system 100 in accordance with the invention is arranged for voice mail having environment-dependent access numbers, with a voice mail box in different environments possessing different related environment-dependent access numbers, and with the interpreting of an environment-dependent access number also taking place on the basis of the length of the access number. In this context, the environment-independent access number is preferably composed of a first part and a second part, with the first part corresponding with the shortest corresponding environment-dependent access number and the second part comprising an additional code. As a result of this, it is possible that, in the system 100, different kinds of access numbers are used, dependent on the environment, i.e., dependent on the location in which such a number is entered, and that the differently entered access numbers are converted, in an efficient manner, into an environmentindependent access number which, with a relatively small length, provides a unique identification of the voice mail box.

It will be understood by those skilled in the art that the invention is not limited to the embodiments set out above, and that many modifications and additions are possible without departing from the scope of the present invention.

I claim:

1. In a system having a telecommunications terminal, a processing member, a network coupling the telecommunications terminal and the processing member, and a voice mail device having at least one voice mail box, a method of processing, at the processing member, an environment-dependent voice mail box access number entered at the telecommunications terminal, said method comprising the steps of:

interpreting, in the processing member, said environment-dependent voice mail box access number based on at least one of (a) a presence of one or more prefixes in the environment-dependent voice mail box access number and a length of the environment-dependent voice mail box access number, wherein the step of interpreting classifies the environment-dependent voice mail box access number as a type selected from a group of types; and converting, in the processing member, said environment-dependent voice mail box access number into an environment-independent voice mail box access number having a predetermined format, unless the type is an excluded type.

2. A method according to claim 1, wherein the predetermined format includes a sub-network code and an abbreviated subscriber number.

3. A method according to claim 2, wherein said abbreviated subscriber number of said environment-independent voice mail box access number has a length equal to zero.

4. A method according to claim 1, wherein said environment-independent voice mail box access number has a fixed number of digits.

5. A method according to claim 1, wherein said environment-independent voice mail box access number includes a first part having an international access number.

6. A method according to claim 1, wherein the environment-independent voice mail box access number is a unique access number.

7. A method according to claim 1, wherein an access number for voice mail box has a structure which is the same as structure of a telephone number.

8. A method according to claim 1, further comprising steps of:

comparing a voice mail box access number to an upper access number limit and a lower access number limit possible within respective environments; and adding, on the basis of the comparing, an environment-related code to the voice mail box access number being determined.

9. A method according to claim 1, wherein special access numbers are a predetermined excluded type.

10. A system for accessing a voice mail box in a voice mail device, the system comprising:

means for storing and reproducing speech in voice mail boxes which are accessible by means of access numbers;

means for transferring speech and access numbers;

means for accepting an environment-dependent voice mail box access number;

means for interpreting the environment-dependent voice mail box access numbers based on at least one of (a) a length of said environment-dependent voice mail box access number and (b) a presence of one or more prefixes in the environment-dependent voice mail box access number;

means for converting the environment-dependent voice mail box access numbers into environment-independent voice mail box access numbers, each having a predetermined format, except when said environment-dependent voice mail box access number is of a predetermined excluded type; and means for accessing the voice mail box using the environment voice mail box access number.

11. A system according to claim 10, wherein said predetermined format includes a sub-network code and an abbreviated subscriber number.

12. A system according to claim 11, wherein said abbreviated subscriber number of said environment-independent voice mail box access number has a length equal to zero.

13. A system according to claim 10, wherein said environment-independent voice mail box access number includes a first part having an international access number.

14. The method of claim 1 further comprising a step of:

accessing, in the voice mail device, a voice mail box using said environment-independent voice mail box access number.

15. In a system having a telecommunications terminal, a processing member, a network coupling the telecommunications terminal and the processing member, and a voice mail device having at least one voice mail box, a method of processing, at the processing member, an environment-dependent voice mail box access number entered at the telecommunications terminal, said method comprising the steps of:

interpreting, in the processing member, said environment-dependent access number based on at least one of (a) a presence of one or more prefixes in the environment-dependent voice mail box access number and a length of the environment-dependent voice mail box access number, wherein the step of interpreting classifies the environment-dependent voice mail box access number as a type selected from a group of types including (a) an abbreviated number, (b) a regional number, (c) an international number, (d) a national number, and (e) a special access number;

converting, in the processing member, said environment-dependent voice mail box access number into an environment-independent voice mail box access number unless the environment-dependent voice mail box access number is classified as a special access number.

16. The method of claim 15 wherein if the environment-dependent voice mail box access number is classified as any one of a regional number, an international number, or a national number, the step of converting includes a sub-step of converting the environment-dependent voice mail box access number to an intermediate international number.

17. The method of claim 16 wherein the intermediate international number does not include an international prefix.

18. The method of claim 1 further comprising steps of:

accepting, at the telecommunications terminal, the environment-dependent voice mail box access number; and accessing one of the at least one voice mail box using the environment-independent voice mail box access number.

* * * * *